Dec. 1, 1931.  J. A. KEGLER  1,834,625
SANDER FOR AUTOMOBILES
Filed Oct. 5, 1931  3 Sheets-Sheet 1
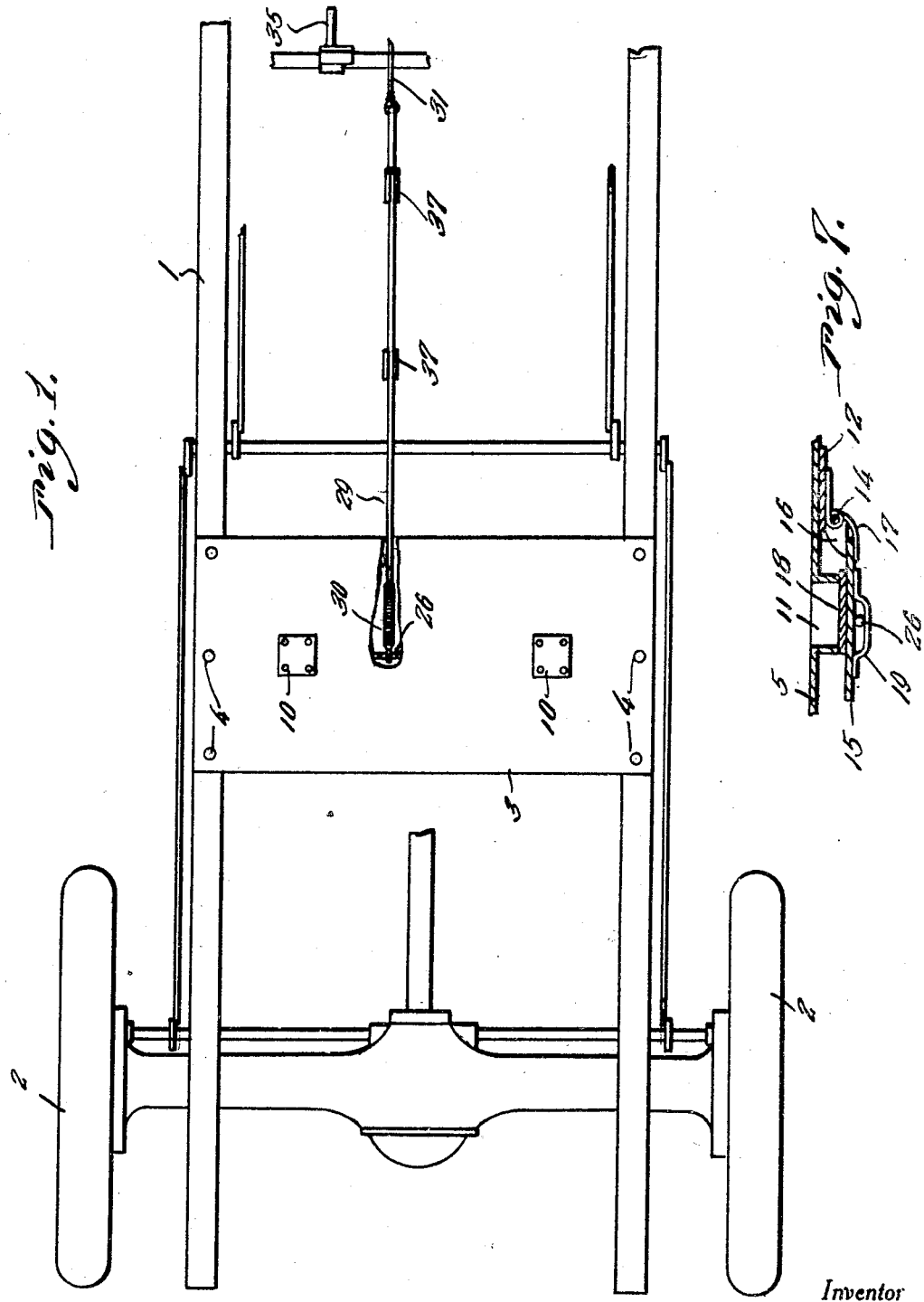

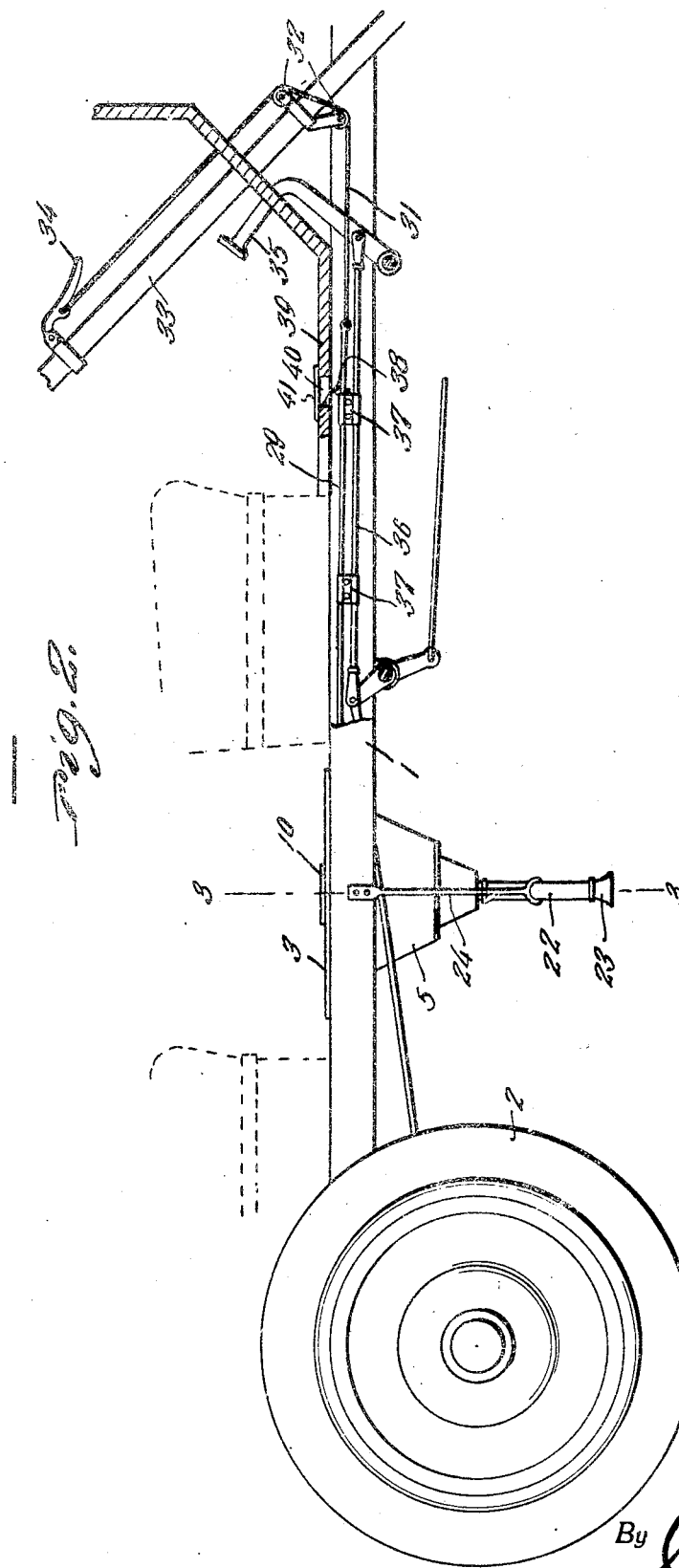

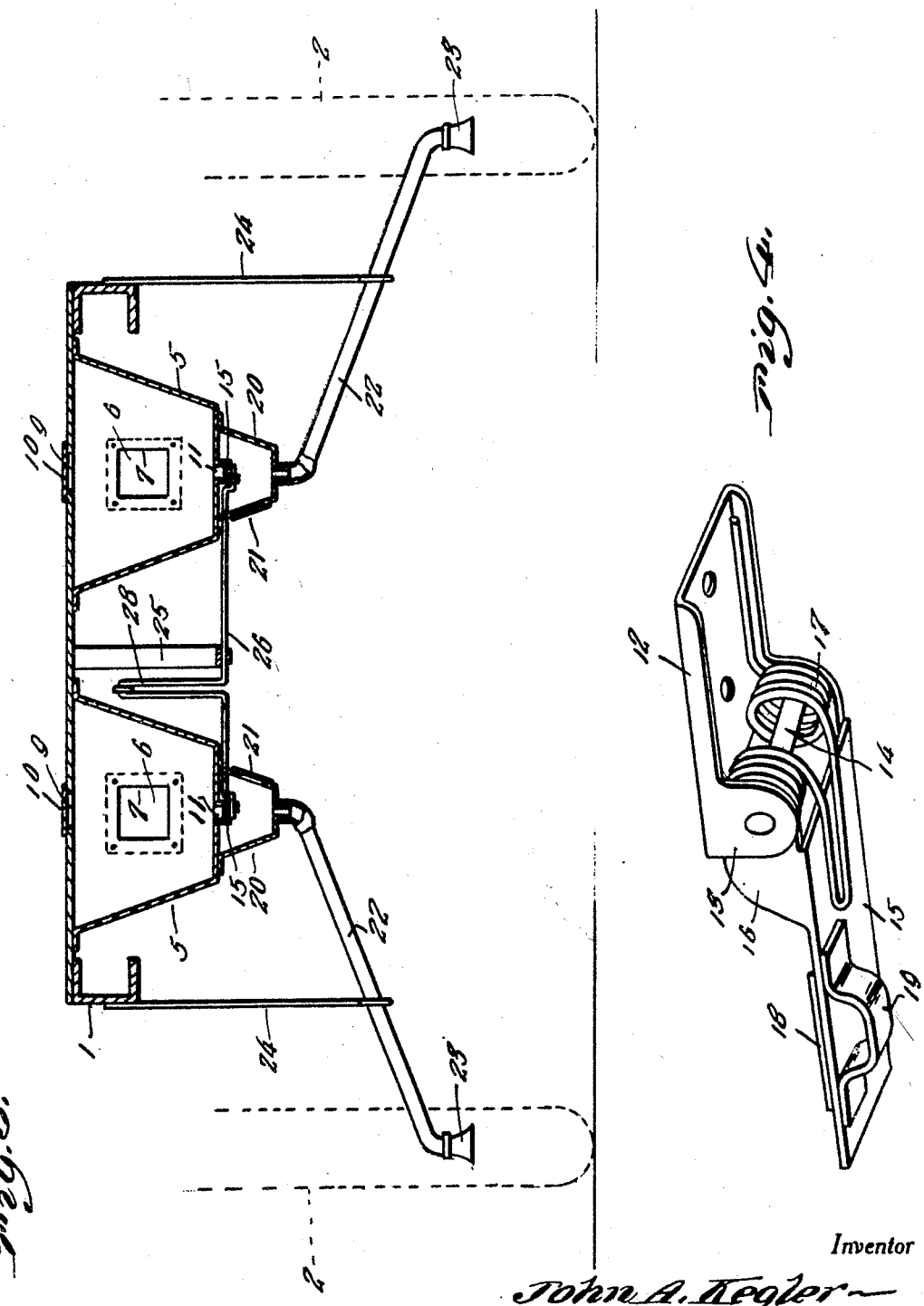

Patented Dec. 1, 1931

1,834,625

UNITED STATES PATENT OFFICE

JOHN A. KEGLER, OF ALDEN, NEW YORK

SANDER FOR AUTOMOBILES

Application filed October 5, 1931. Serial No. 567,014.

The present invention relates to a sander for automobiles, and has for its primary object to provide, in a manner as hereinafter set forth, a device of this character embodying the novel construction, combination and arrangement of parts through the medium of which traction of the rear wheels of the vehicle will be materially increased when desired, as on slippery surfaces and skidding will be substantially eliminated.

Another important object of the invention is to provide a sander for automobiles embodying novel control means through the medium of which the sander may be caused to function simultaneously with the application of the brakes of the automobile or disconnected from the brake operating mechanism to permit the independent operation of said mechanism and to permit the sanding mechanism to be brought into use by hand when necessary or desirable.

Other objects of the invention are to provide a sander for automobiles of the character described which will be simple in construction, strong, durable, efficient and reliable in use, inconspicuous and which may be expeditiously installed for operation on automobiles of conventional construction without the necessity of materially altering said automobiles structurally.

All of the foregoing and still further objects and advantages of the invention will become apparent from a study of the following specification, taken in connection with the accompanying drawings wherein like characters of reference designate corresponding parts throughout the several views and wherein:

Figure 1 is a view in top plan showing the rear portion of an automobile with the body removed therefrom and with a sander in accordance with this invention mounted in position on the automobile frame, a corner of the device being broken away to better illustrate the resilient connection of the actuating rod to the valve operating crank shaft.

Figure 2 is a view in side elevation of the sander, showing same mounted on the automobile, said automobile being partially in vertical longitudinal section.

Figure 3 is a view in vertical cross section taken substantially on the line 3—3 of Figure 2.

Figure 4 is a detail view in perspective of one of the spring closed pivoted valves.

Figure 5 is a detail view in section showing the means for detachably connecting the valve operating rod to the brake rod of the automobile for actuation by said brake rod.

Figure 6 is a fragmentary view in perspective showing a portion of the crank shaft.

Figure 7 is a detail view in vertical longitudinal section through the bottom portion of one of the hoppers showing the control valve in closed position thereon.

Referring now to the drawings in detail, it will be seen that the reference numeral 1 designates the rear portion of the frame of an automobile and 2 are the rear wheels thereof. A metallic supporting plate 3 extends across a rear portion of the frame 1 and rests thereon and is secured by suitable means as at 4. Secured to the plate 3 and depending therefrom are the hoppers 5 which are transversely alined and which are provided with clean out openings which are closed by the removable plates 6. The cleanout openings for the hoppers 5 are designated by the reference numeral 7. The supporting plate 3 is provided with openings 9 for filling the hoppers 5 with sand, said filling openings 9 being closed by the removable plates 10.

Depending from the bottoms of the hoppers 5 are the discharge necks 11. Plates 12 are rigidly secured in any suitable manner to the bottoms on the hoppers 5 forwardly of the discharge neck 11 and said plates 12 are provided with right angularly disposed apertured ears 13 between which a pivot pin 14 extends. The reference numeral 15 designates a swinging valve which is pivotally mounted on the plate 12 for swinging movement in a vertical plane toward and away from the free ends of the discharge necks 11 through the medium of the apertured ears 16 through which the pin 14 passes. A spring 17 is convoluted about the pin 14 between the ears 16 and is operatively engaged with the valve 15 for yieldingly urging the same toward its closed position.

Each valve 15 is provided with a pad 18 of suitable material, such as leather or rubber, for engagement with the free end of the respective discharge neck 11. Secured to the lower sides of the valves 15 are the elongated loops 19 the purpose of which will be presently set forth.

Substantially hopper shaped housings 20 are mounted on the bottoms of the hoppers 5 and enclose the valves 15. In their inner sides the housings 20 are provided with clean-out openings which are closed by the removable plates 21. These last named openings also allow access to be had to the valves 15 when desired.

Conduits 22 are connected to the housings 20 for receiving sand therefrom and extend outwardly and downwardly and terminate in the nozzles 23 which are disposed forwardly of the wheels 2 of the vehicle. Hangers 24 depend from the frame 1 for supporting the conduits 22.

A bracket 25 extends from the plate 3 between the hoppers 5 and has journalled in its lower end a transversely disposed crank shaft 26 the end portions of which extend rotatably into the housings 20 and terminate in the crank arms 27 which project into the loops 19 and are operatively connected to the valves 15 thereby. The crank shafts 26 further include a substantially U-shaped intermediate portion constituting an arm 28. A rod 29 is connected, at one end, to the upper end of the arm 28 of the crank shaft 26 through the medium of a coil spring 30.

An operating cable 31 is connected at one end to the other end of the rod 29 and is trained over the pulleys 32 which are mounted on the steering column 33 of the vehicle. The cable 31 is connected to a hand lever 34 which is mounted for swinging movement on the steering column 33.

The reference numeral 35 designates the usual brake pedal of the vehicle to which is pivotally connected the brake rod 36. The rod 29 is disposed in substantially spaced parallelism to the brake rod 36. Clamps 37 are fixed on the brake rod 36 at spaced points and slidably embrace the rod 29. The rod 29 is provided with an opening for the reception of a removable pin 38 which, when engaged by the forward post clamp 37, connects the rod 29 with the brake rod 36 for actuation in a forward direction thereby. The floor board 39 of the vehicle is provided with an opening 40 through which access may be had to the pin 38 for conveniently removing or inserting same.

A closure plate 41 is provided for the opening 40. If desired, the pin 38 may be connected to the floor board 39 by a cable or chain 42 to prevent loss of said pin.

In use, the valves 15 are normally maintained in closed position by the springs 17. With the pin 38 in position in the openings provided therefor in the rod 29, the valves 15 will be opened when the brakes of the vehicle are applied or said valves may be opened by hand by simply actuating the lever 34. When the brake pedal 35 is depressed to move the brake rod 36 forwardly in the usual manner for applying the brakes, the forwardmost clamp 37 will as hereinbefore explained engage the pin 38 and cause the rod 39 to move forwardly with the brake rod 36.

This movement of the rod 29, of course, rocks the rock shaft 26 with the result that the crank arms 27 swing the valves 15 downwardly against the tension of the springs 17 to permit the sand to flow by gravity from the hoppers 5.

Of course, the rod 29 may be moved forwardly independently by hand without moving the brake rod 36, the pin 38 simply moving forwardly from the forwardmost clamp 37 when it is desired to open the valves 15 by hand. When the pin 38 is removed, the clamp 37 will slide freely on the rod 29 upon movement of the brake rod 36, thus preventing opening of the valves 15 when it is not desired to discharge the sand upon the application of the vehicle brake, as in good weather or on dry streets.

It is believed that the many advantages of a sander in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

Having thus described my invention, what I claim as new is:

1. A sanding device for automobiles comprising a plate mounted transversely on the frame of the automobile, hoppers for the reception of sand, depending from the plate, discharge necks depending from the hoppers, valves pivotally mounted on the bottoms of the hoppers and engageable with the necks for controlling the discharge of the sand, elongated loops on the valves, resilient means yieldingly urging the valves toward the closed position, a bracket depending from the plate between the hoppers, a crank shaft journalled on the bracket and including crank arms operatively engaged with the loops for opening the valves, and means for actuating the crank shaft.

2. A sanding device for automobiles comprising a plate mounted transversely on the frame of the automobile and secured thereto, hoppers for the reception of sand, depending from the plate, discharge necks depending from the hoppers, valves pivotally mounted on the bottoms of the hoppers and engageable with the necks for controlling the charge of the sand, elongated loops on the valves, resilient means yieldingly urging the valves toward closed position, a bracket depending from the plate between the hoppers, a crank shaft journalled on the bracket and including crank arms operatively engaged in the loops for opening the valves, substantially hopper shaped housings depending from the hoppers and enclosing the valves, conduits for the sand connected to the bottoms of the housings and extending therefrom for depositing the sand in the path of the rear wheels of the automobile, hangers depending from the frame of the automobile for supporting the conduits, and means for actuating the crank shaft.

3. A sanding device for automobiles comprising a plate mounted transversely on the frame of the automobile and secured thereto, hoppers for the reception of sand, depending from the plate, discharge necks depending from the hoppers, valves pivotally mounted on the bottoms of the hoppers and engageable with the necks for controlling the discharge of the sand, elongated loops on the valves, resilient means yieldingly urging the valves toward closed position, a bracket depending from the plate between the hoppers, a crank shaft journalled on the bracket and including crank arms operatively engaged in the loops for opening the valves, substantially hopper shaped housings depending from the hoppers and enclosing the valves, conduits for the sand connected to the bottoms of the housings and extending therefrom for depositing the sand in the path of the rear wheels of the automobile, hangers depending from the frame of the automobile for supporting the conduits, and means for actuating the crank shaft, the plate having filling openings therein for the passage of the sand into the hoppers, said hoppers having clean out openings therein, the housings having clean out openings therein and removable closure plates disposed over all of said openings.

4. A sanding device for automobiles comprising a supporting plate mounted transversely of the frame of the automobile, hoppers for the reception of sand, depending from the plate, discharge necks depending from the hoppers, plates rigidly secured to the bottoms of the hoppers, substantially right angularly disposed apertured ears depending from the second plate, a pivot pin extending between ears, valves operatively engageable with the free ends of the discharge necks for controlling the discharge of the sand from the hoppers, apertured ears on the valves, the pivot pins extending through the ears for mounting the valves on the second named plates for swinging movement toward and away from the discharge necks, springs mounted on the second named plates and engaged with the valves for yieldingly urging said valves toward the discharge necks, and means for swinging the valves to open position against the tension of the springs.

5. A sanding device for automobiles comprising a hopper mounted on the automobile, said hopper for the convenience of the sand, valve controlling means for controlling the discharge of the sand from the hopper, and means for actuating the valve controlled means, the last named means including a rod disposed in spaced, substantial parallelism to a brake rod of the automobile, clamps fixed on said brake rod and slidably embracing the first named rod, an abutment removably mounted on the first named rod for engagement by one of the clamps for connecting said first named rod to the brake rod for actuation thereby in one direction.

6. A sanding device for automobiles comprising a hopper mounted on the automobile, said hopper for the convenience of the sand, valve controlling means for controlling the discharge of the sand from the hopper, and means for actuating the valve controlled means, the last named means including a rod disposed in spaced, substantial parallelism to a brake rod of the automobile, clamps fixed on said brake rod and slidably embracing the first named rod, an abutment removably mounted on the first named rod for engagement by one of the clamps for connecting said first named rod to the brake and for actuation thereby in one direction, the last named means further including a lever mounted for swinging movement on the automobile and a cable operatively connecting the first named rod to the lever for actuation thereby.

7. A sanding device for automobiles comprising a hopper for the reception of the sand mounted on the automobile, valved discharge means connected with the hopper, a crank shaft operatively connected with the valved discharging means for actuating the same, clamps fixed on a brake rod of the automobile, a rod slidably mounted in the clamps, a coil spring connecting the second named rod to the crank shaft, an abutment removably mounted on the second named rod for engagement by one of the clamps for connecting the second named rod to the brake rod for actuation in one direction thereby, a lever mounted for swinging movement on the steering column of the automobile, pulleys mounted on said steering column below the lever, and a cable connected, at one end, to the lever and at its other end to the second named rod for connecting said second named rod to the lever for actuation thereby, said cable being trained over the pulleys.

In testimony whereof 1 affix my signature.

JOHN A. KEGLER.